US008469386B2

(12) United States Patent
Clark et al.

(10) Patent No.: US 8,469,386 B2
(45) Date of Patent: Jun. 25, 2013

(54) SWIVEL DRAWBAR HITCH

(75) Inventors: Stanley R. Clark, Hesston, KS (US); Dwight E. Nickel, Newton, KS (US)

(73) Assignee: AGCO Corporation, Duluth, GA (US)

( * ) Notice: Subject to any disclaimer, the term of this patent is extended or adjusted under 35 U.S.C. 154(b) by 0 days.

(21) Appl. No.: 13/314,638

(22) Filed: Dec. 8, 2011

(65) Prior Publication Data
US 2012/0151892 A1 Jun. 21, 2012

Related U.S. Application Data

(60) Provisional application No. 61/420,895, filed on Dec. 8, 2010.

(51) Int. Cl.
B60D 1/167 (2006.01)
(52) U.S. Cl.
USPC ............................ 280/494; 172/450; 172/248
(58) Field of Classification Search
USPC ........ 280/494, 423.1, 446.1, 456.1; 180/53.1, 180/53.3; 172/439, 449, 450, 445, 457; 403/102
See application file for complete search history.

(56) References Cited

U.S. PATENT DOCUMENTS

| 5,099,937 | A | * | 3/1992 | McLean | 180/53.3 |
| 5,355,971 | A | * | 10/1994 | Austin et al. | 180/53.1 |
| 5,531,283 | A | * | 7/1996 | Austin et al. | 180/53.1 |
| 5,647,604 | A | * | 7/1997 | Russell | 280/492 |
| 5,706,901 | A | * | 1/1998 | Walters et al. | 172/439 |
| 5,873,229 | A | * | 2/1999 | Franet | 56/15.7 |
| 6,203,049 | B1 | * | 3/2001 | Gibson | 280/494 |
| 6,412,570 | B1 | * | 7/2002 | Pruitt et al. | 172/449 |
| 6,776,432 | B2 | * | 8/2004 | Harkcom et al. | 280/494 |
| 6,877,758 | B2 | * | 4/2005 | Colistro | 280/494 |
| 7,308,947 | B2 | * | 12/2007 | Barnett | 172/439 |
| 7,938,431 | B1 | * | 5/2011 | Snyder | 280/494 |
| 8,096,571 | B1 | * | 1/2012 | Noe | 280/492 |
| 8,118,323 | B2 | * | 2/2012 | Hudson | 280/494 |

* cited by examiner

Primary Examiner — Árpád Fábián-Kovács

(57) ABSTRACT

A swivel drawbar hitch has a first cradle having a first pivot mechanism located ahead of a connection between a drawbar and the swivel drawbar hitch, the swivel drawbar hitch further including an elongated second cradle coupled to the first cradle and further having a second pivot mechanism, the first cradle pivotable about a horizontal axis of the swivel drawbar hitch, the elongated second cradle pivotable about a longitudinal axis of the swivel drawbar hitch.

20 Claims, 6 Drawing Sheets

SWIVEL DRAWBAR HITCH

RELATED APPLICATION

Under provisions of 35 U.S.C. §119(e), Applicant claims the benefit of U.S. Provisional Application No. 61/420,895 filed Dec. 8, 2010, which is incorporated herein by reference.

TECHNICAL FIELD

The present disclosure generally relates to hitches for pull-type implements.

BACKGROUND

A pull-type implement is generally towed by a tractor through the use of a hitch assembly. Such a hitch assembly may be coupled to a drawbar of the tractor, or designed for use with the lower links of a three point hitch of the tractor, among other coupling mechanisms. Some hitch assemblies may allow for relative movement of the pull-type implement with respect to the tractor, such as when travelling over uneven surfaces. During such movements, the hitch assembly may be subject to various loads (e.g., bending loads) that can accelerate the failure of one or more components of the hitch assembly.

SUMMARY

In one embodiment, a swivel drawbar hitch comprising a first cradle having a first pivot mechanism located ahead of a connection between a drawbar and the swivel drawbar hitch, the swivel drawbar hitch further comprising an elongated second cradle coupled to the first cradle and further having a second pivot mechanism, the first cradle pivotable about a horizontal axis of the swivel drawbar hitch, the elongated second cradle pivotable about a longitudinal axis of the swivel drawbar hitch.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
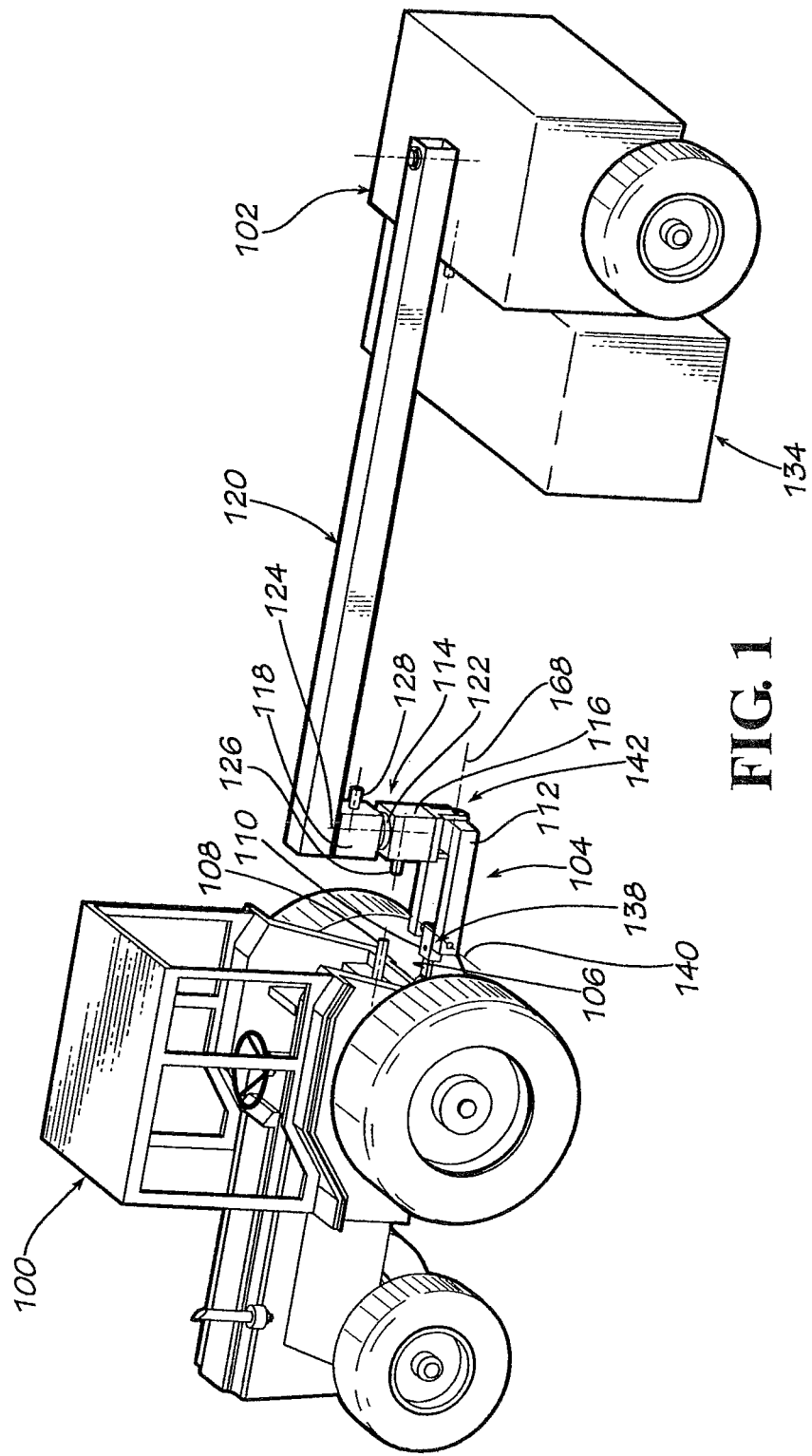
FIG. 1 is a partial perspective view of a typical tractor and a pull-type implement in which an embodiment of a swivel drawbar hitch may be utilized.

Certain embodiments of a swivel drawbar hitch are disclosed that may be used in conjunction with a tractor and a pull-type implement. One embodiment of an example swivel drawbar hitch comprises a gearbox assembly comprising a lower right-angle gearbox and an upper, right angle gearbox that swivels about an upright axis relative to the lower, right angle gearbox. The upper and lower right angle gearboxes share a common upright drive shaft that couples an input, U-joint driveline assembly (e.g., components conveying power from a power take-off residing at the tractor to the lower right angle gearbox) to an output, U-joint driveline assembly extending from the upper right angle gearbox to the pull-type implement. The example swivel drawbar hitch further comprises a first cradle for receipt of a drawbar that extends rearwardly from the tractor and an elongated second cradle pivotally coupled both to the first cradle and a bracket that is coupled to the lower right angle gearbox. The first cradle comprises a first pivot mechanism that isolates (and absorbs), or substantially isolates, upward and downward bending loads from the rest of the swivel drawbar hitch; the first pivot mechanism located between the tractor and the connection between the drawbar pin and drawbar, placing the vertical load directly on the drawbar without the bending loads. The elongated second cradle comprises a second pivot mechanism that isolates (and absorbs), or substantially isolates, yaw-type movements (e.g., side-to-side pivot movement) from the rest of the swivel drawbar hitch.

Digressing briefly, for certain conventional implementations, swivel drivelines for use with various pull-type implements, such as power train mower conditioners (among others), allow high bending loads into the gearbox swivel joint due, at least in part, to the interference between the tractor drawbar and the implement hitch when traveling along uneven surfaces, such as through field ditches and hills. One solution involves the addition of a dual ball-joint, bracketing structure to absorb these bending loads, which may add significant cost to the gearbox assembly. Alternatively, the bending moments are allowed directly through the swivel joint. Embodiments of the swivel drawbar hitch, such as that described briefly above, provide a solution whereby a pivot joint (corresponding to the aforementioned first pivot mechanism) is positioned ahead of a drawbar pin (or equivalently, closer to the drawbar) that couples the first cradle to the drawbar. Such a configuration places the vertical loading directly on the drawbar without the bending loads (i.e., the first pivot joint absorbs the bending loads). The radial bending is likewise removed (absorbed) by an additional pivot joint (corresponding to the second pivot mechanism of the elongated second cradle and located underneath the gearbox assembly), which is located in a plane approximately 90° relative to a plane defined by the first pivot joint. Hence, one or more embodiments of the swivel drawbar hitch may significantly reduce the loads in the swivel gearbox assembly without incurring a large increase in production costs.

The following detailed description refers to the accompanying drawings. Wherever possible, the same reference numbers are used in the drawings and the following description to refer to the same or similar elements. While certain embodiments of the disclosure may be described, modifications, adaptations, and other implementations are possible as should be understood by one having ordinary skill in the art in the context of the disclosure. For example, substitutions, additions, or modifications may be made to the elements illustrated in the drawings, and the methods described herein may be modified by substituting, reordering, or adding stages to the disclosed methods.

Although described in the context of a system comprising a tractor and a pull-type implement comprising a mower conditioner, it should be understood by one having ordinary skill in the context of the present disclosure that other equipment may be substituted to equal or substantially equal effect. Further features and/or variations may be provided in addition to those set forth herein.

Referring to FIGS. 1-6, and in particular, FIG. 1, shown is a partial perspective view of a typical tractor 100 and a pull-type implement 102 in which an embodiment of a swivel drawbar hitch 104 may be utilized. It should be understood by one having ordinary skill in the art, in the context of the present disclosure, that the example components illustrated in FIGS. 1-6 are merely illustrative, and should not be construed as implying any limitations upon the scope of the disclosure. In particular, the tractor 100 comprises a rearwardly extending drawbar 106 and a rearwardly extending power take-off shaft 108 that both couple to the swivel drawbar hitch 104 in a manner as described below.

The swivel drawbar hitch 104 comprises a first cradle 110, an elongated second cradle 112, a gearbox assembly 114 comprising a lower right angle gearbox 116 and an upper right angle gearbox 118. A fore-and-aft extending tongue assembly 120 is attached to the upper right angle gearbox 118, and couples the tractor 100 to the pull-type implement 102 as further described below. The lower right angle gearbox 116 and upper right angle gearbox 118 share a common, upright drive shaft (not shown) housed within an intermediate collar 122 so that the output of lower right angle gearbox 116 is received as input by the upper right angle gearbox 118. The upper right angle gearbox 118 swivels (relative to the lower right angle gearbox 116 located beneath the upper right angle gearbox 118) about an upright axis 124 that is common to the axis of rotation of the internal drive shaft between the two gearboxes 116,118. The lower right angle gearbox 116 has an input shaft 126 disposed at right angles to the internal drive shaft between the two gearboxes 116 and 118. Similarly, the upper right angle gearbox 118 has an output shaft 128 disposed at right angles to the internal drive shaft between the two gearboxes 116 and 118. In some embodiments, gearboxes 116 and 118 may be obtained as a fully assembled unit from corner S.p.A. of Reggio Emilia, Italy. A suitable corner unit is available as pull-through swivel gearbox Model T-279D.

Figure 2:
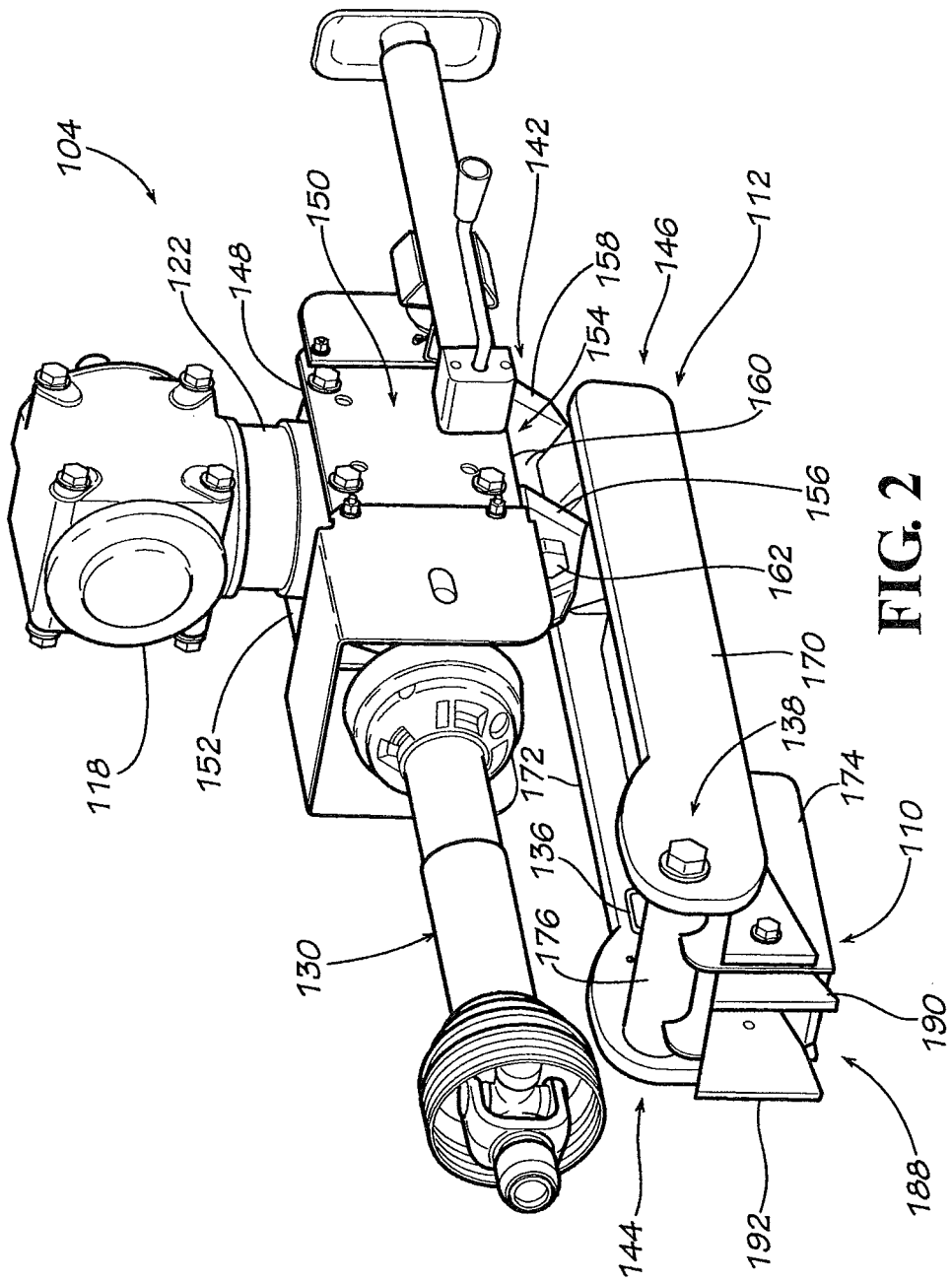
FIG. 2 is a partial perspective view of a front end of an embodiment of a swivel drawbar hitch.

The input shaft 126 of the lower right angle gearbox 116 is connected to the rearwardly extending power take-off shaft 108 of the tractor 100 via a U-joint driveline assembly 130 (FIG. 2). The output shaft 128 of the upper right angle gearbox 118 is connected to a U-joint driveline assembly 132 (FIG. 6) of the tongue assembly 120, the U-joint driveline assembly 132 responsible at least in part for driving operating components of the pull-type implement 102. A header 134 of the pull-type implement 102 carries driven (e.g., mechanically driven) components, such as rotary cutters, conditioner rolls, etc. Thus, power to the operating components of the pull-type implement 102 is derived from the power take-off shaft 108, U-joint driveline assembly 130, input shaft 126 of the lower right angle gearbox 116, internal drive shaft between the lower right angle gearbox 116 and the upper right angle gearbox 118, output shaft 128 from upper right angle gearbox 118, and U-joint driveline assembly 132.

The swivel drawbar hitch 104 is adapted for coupling the tongue assembly 120 with the rearwardly extending drawbar 106 of the tractor 100 for establishing a draft connection between the tractor 100 and the pull-type implement 102. The swivel drawbar hitch 104 is pivotally connected to the tongue assembly 120 for left and right pivoting movement about upright axis 124.

Figure 3:
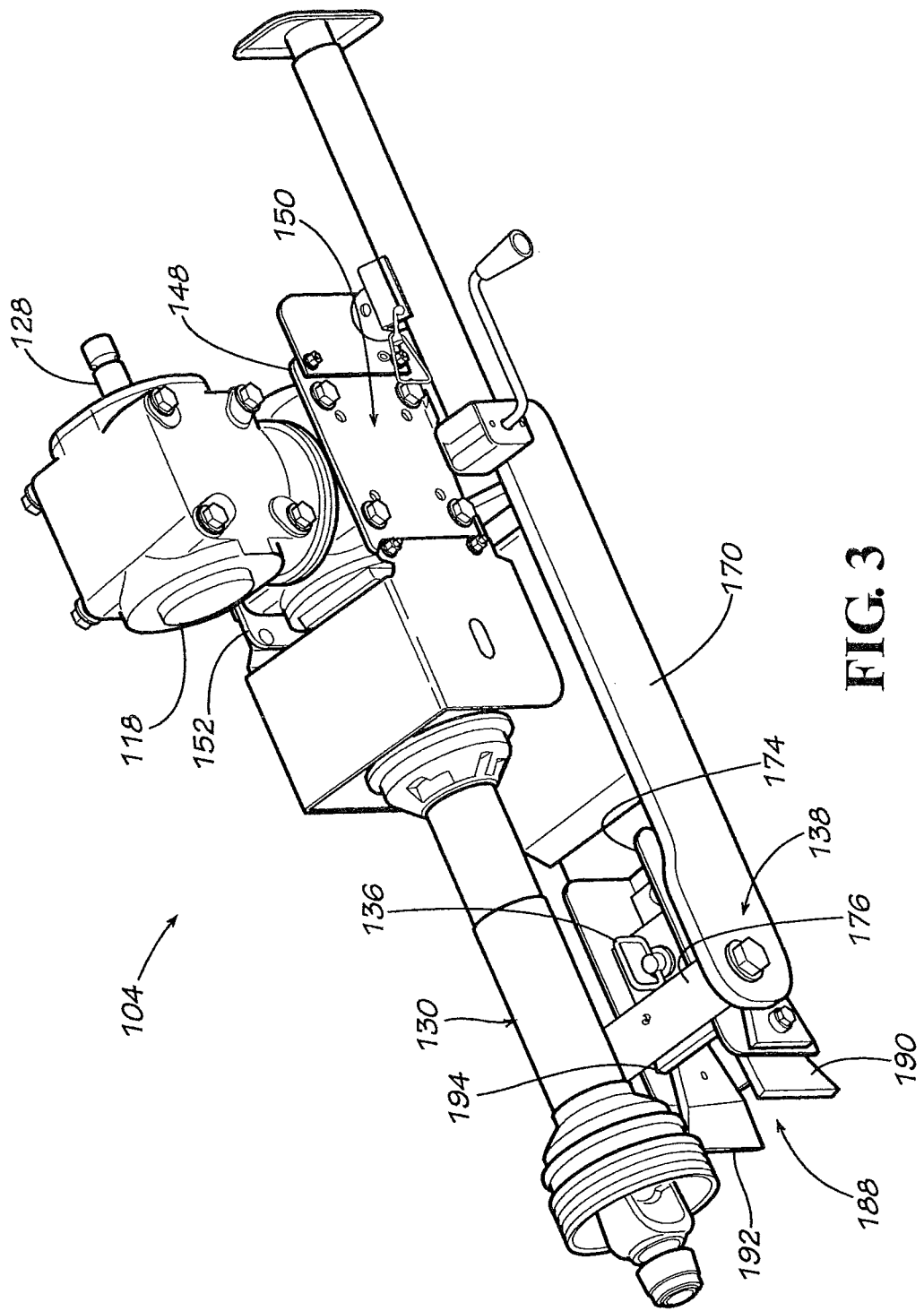
FIGS. 3-4 are partial perspective views of a front end of an embodiment of a swivel drawbar hitch, respectively rotated relative to FIG. 2, to show an example drawbar pin position relative to a first pivot mechanism.
Figure 4:
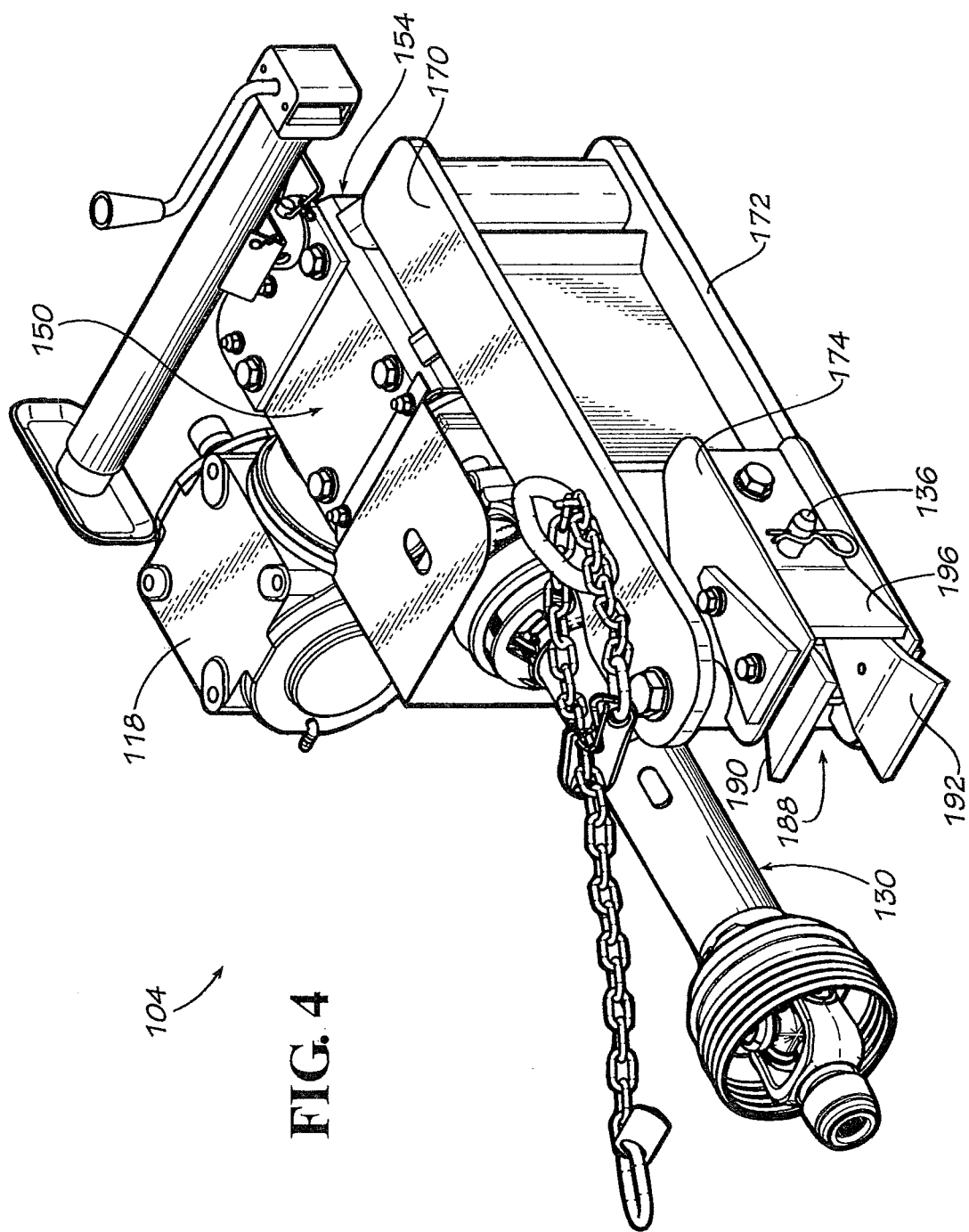

The first cradle 110 receives the drawbar 106, the received drawbar secured to the first cradle by a drawbar pin 136 (FIGS. 2-4). The first cradle 110 further comprises a first pivot mechanism 138 disposed between the drawbar pin 136 and the tractor 100, the first pivot mechanism 138 enabling upward and downward movement of the tractor 100 relative to the pull-type implement 102, the movement occurring about a transverse horizontal axis 140 of the swivel drawbar hitch 104. The elongated second cradle 112 is coupled to the first cradle 110 at a location coincident with the first pivot mechanism 138 as explained below. The elongated second cradle 112 comprises a second pivot mechanism 142 that rotates about an axis approximately 90° relative to a an axis defined by the first pivot mechanism 138, enabling side-to-side (yaw) movement of the pull-type implement 102 relative to the tractor 100. As explained above, the first and second pivot mechanisms 138 and 142, respectively, absorb the bending loads imposed by respective up-and-down and/or yaw movements as the pull-type implement 102 is towed over uneven surfaces. Further, the location of the first pivot mechanism 138 ahead of the connection between the drawbar 106 and drawbar pin 136 places the vertical loading directly on the drawbar without the bending loads.

FIG. 2 is a partial perspective view of a front end of the swivel drawbar hitch 104 shown in further detail. The swivel drawbar hitch 104 comprises a two-piece, coupled construction comprising the first cradle 110 for primary receipt of the drawbar 106 (FIG. 1) and the elongated second cradle 112 pivotably coupled to the first cradle 110. The first cradle 110 is located at a forward end 144 of the elongated second cradle 112, and the gearbox assembly 114 is pivotably coupled to a rearward end 146 of the elongated second cradle 112. A multi-sided (e.g., 3-sided) bracket 148 is fixed to the lower right angle gearbox 116 of the gearbox assembly 114, and includes a first side 150 and a similarly dimensioned second side 152 that laterally opposes the first side 150. The multi-sided bracket 148 further comprises a bottom side 154 adjacent the bottom of the lower right angle gearbox 116, the bottom side 154 having laterally-spaced, similarly-dimensioned opposing transverse members (e.g., flanges) 156,158 extending out (e.g., downwardly) from the bottom side 154 and located proximal to the front and rear end of the bottom side 154, respectively. The opposing transverse members 156,158 comprise similarly dimensioned, laterally opposing upright walls, each wall extending in a respective vertical plane that runs in a direction parallel to the transverse horizontal axis 140. Each wall of the transverse members 156,158 has a respective slot running therethrough, the slots coincident with, and adjacent to, fore-and-aft open ends of a connector or pivot bar (e.g., cylindrical hollow sleeve) 160 of the second pivot mechanism 142. In other words, the connector 160 is disposed between the transverse members 156, 158, with the slots of the transverse members 156,158 aligned with the opposing open ends of the connector 160 in the longitudinal direction of the swivel drawbar hitch 104. A securing element (e.g., bolt) 162 is disposed in a coincident manner through each slot of the transverse members 156,158, a bushing 164 (FIG. 5) disposed within and surrounded by the connector 160, and the connector 160, and secured on the exiting side (e.g., rearward side) of the connector 160 by a securing element (e.g., nut) 166 (FIG. 5, secured along with respective washers proximal to each end of the connector 160), securing the gearbox assembly 114 to the rearward end 146 of the elongated second cradle 112 and enabling pivoting (e.g., side-to-side or yaw movement) of the elongated second cradle 112 about a longitudinal axis 168 (FIG. 1) of the swivel drawbar hitch 104.

Figure 5:
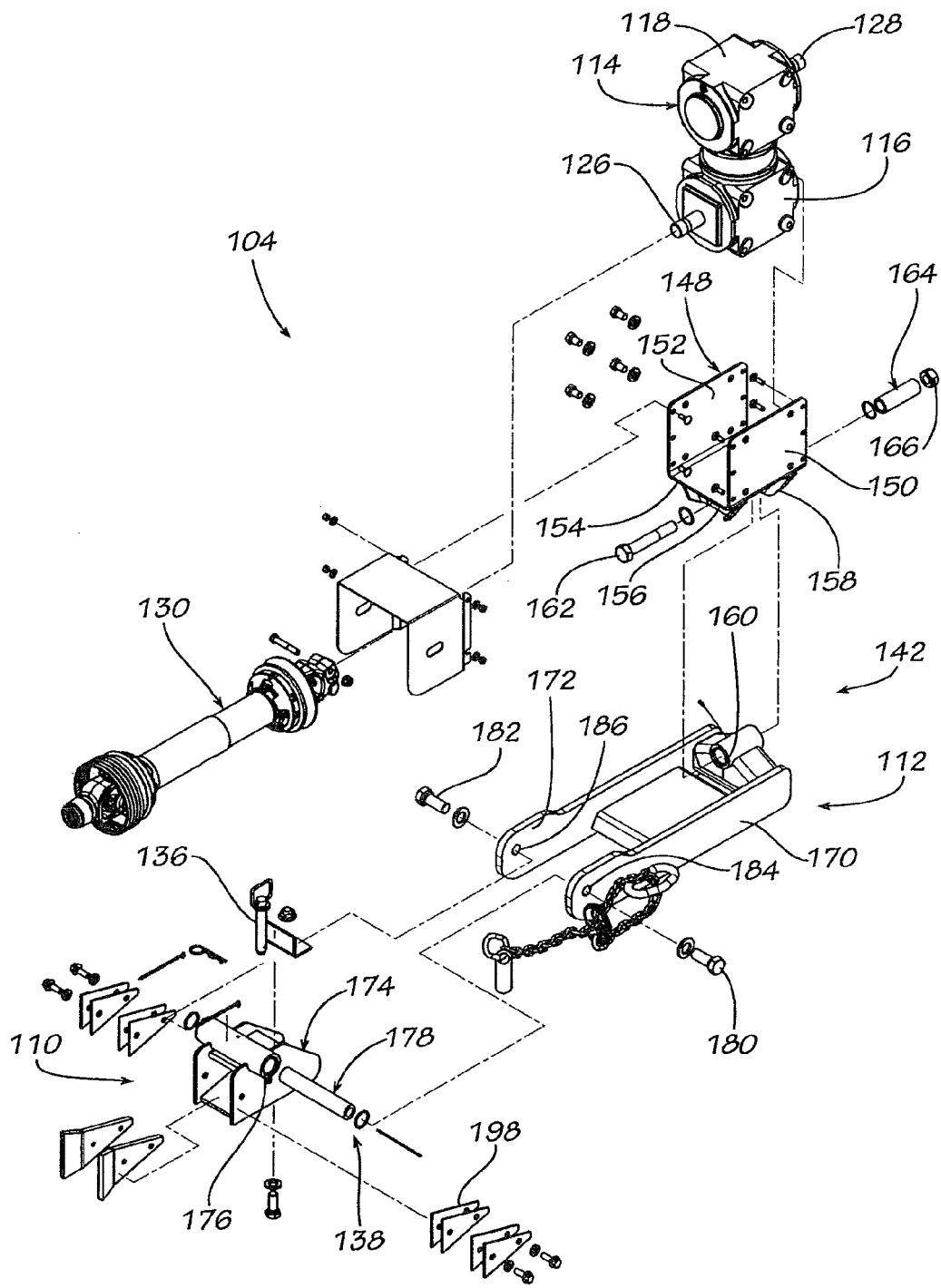
FIG. 5 is a partial, exploded perspective view of a front end of certain features of the swivel drawbar hitch shown in FIGS. 2-4.

The elongated second cradle 112 comprises laterally-spaced, opposing fore-and-aft sidewalls 170,172, with the forward end 144 pivotably coupled to the first cradle 110 and the rearward end 146 comprising the connector 160 that is pivotably coupled to the gearbox assembly 114. The first cradle 110 comprises a curved frame 174 that partially holds (e.g., in the curvature of the frame 174) a connector or pivot bar (e.g., cylindrical hollow sleeve) 176 corresponding to the first pivot mechanism 138. The connector 176 surrounds a bushing 178 (FIG. 5). The connector 176 (and bushing 178) is secured between the sidewalls 170,172 by securing elements 180,182 (FIG. 5, e.g., bolts, and further secured with respective one or more washers) running transverse to the longitudinal axis 168 and that penetrate respective slots 184, 186 (FIG. 5) in the sidewalls 170, 172 and respective openings of the connector 176. In other words, the first pivot mechanism 138 comprises the connector 176 and the surrounded bushing 178, both secured in between the sidewalls 170,172 by securing elements 180,182, which secure an alignment of the connector 176 and bushing 178 with the slots 184,186 of the sidewalls 170,172. The connector 176 of the first pivot mechanism 138 defines an axis of rotation 140 along a horizontal plane, whereas the connector 160 of the second pivot mechanism 142 defines an axis of rotation 168 along a vertical plane.

A receiving end (proximal to the forward end 144) of the first cradle 110 comprises a fore-and-aft extending socket 188 that receives the drawbar 106. The socket 188 is defined by a pair of upright, laterally spaced sidewalls 190,192. Referring to FIGS. 3-4 for further detail of the first cradle 110, the socket 188 is further defined by a transverse top wall 194 extending between laterally spaced sidewalls 190,192, and a transverse bottom wall 196 spaced below the top wall 194 and likewise extending between laterally spaced sidewalls 190,192. The laterally spaced sidewalls 190,192, top wall 194, and bottom wall 196 all flare outwardly so as to define an enlarged entry mouth for the socket 188. The socket 188 is generally rectangular in cross-sectional configuration, but of generally decreasing area dimension from fore-to-aft, the decreasing beginning from the curvature of the frame 174 coincident with the placement of the connector 176. The drawbar pin 136 (e.g., clevis pin, etc.) is disposed rearward relative to the connector 176, and is used to secure the drawbar 106 to the first cradle 110 and hence to the swivel drawbar hitch 104.

Also noted from FIGS. 1-4 is that the swivel drawbar hitch 104 further comprises the U-joint driveline assembly 130 coupled to the input shaft 126 that extends forward from the lower right angle gearbox 116 and to the power take-off shaft 108 that extends rearward from the tractor 100.

FIG. 5 is a partial, exploded perspective view of the front end of certain features of the swivel drawbar hitch 104. The first cradle 110 partially holds the connector 176 of the first pivot mechanism 138 in the curvature (e.g., semi-circular shape) located at the top-side of the curved frame 174. The connector 176 receives the bushing 178, the latter surrounded by the connector 176, and the combination of the connector 176 and bushing 178 are secured between the fore-and-aft sidewalls 170,172 proximal to the forward end 144 by the securing elements 180,182 and any associated hardware. Shims 198 may also be secured to the first cradle 110 and removed for placement within the socket 188 to ensure a suitable fit with the drawbar 106. The first pivot mechanism 138, and its location relative to the connection between the drawbar 106 and drawbar pin 136, enables pivotable movement about the transverse horizontal axis 140, removing (or substantially removing) bending loads (e.g., based on up-and-down movements) from the rest of the swivel drawbar hitch 104.

The elongated second cradle 112 comprises the connector 160 located proximal to the rearward end 146, the connector 160 defining the longitudinal axis 168 that is offset 90° from the transverse horizontal axis 140. As described above, the connector 160 (and bushing 164 surrounded by the connector 160) are pivotably secured between the transverse members 156,158 by the securing element 162, enabling pivotal movement about the longitudinal axis 168. The second pivot mechanism 142, comprising the assembly of the connector 160 and bushing 164 coupled to the transverse members 156,158 of the multi-sided bracket 148 by the securing element 162 and any associated hardware, enables pivotal movement about the longitudinal axis 168, removing (or substantially removing) bending loads (e.g., based on yaw movements) from the rest of the swivel drawbar hitch 104.

Figure 6:
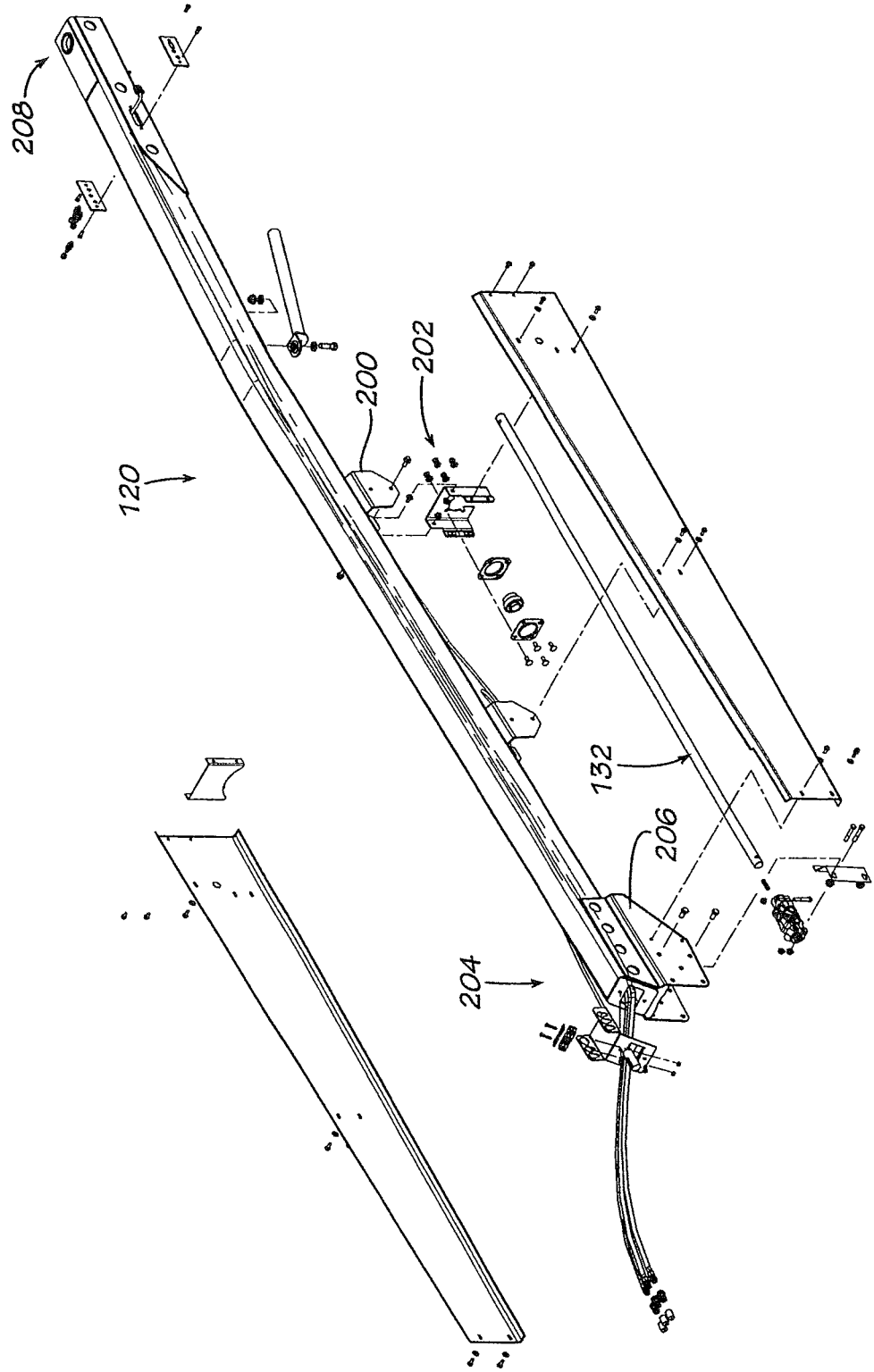
FIG. 6 is a partial, exploded perspective view of a front end of certain features of an example tongue assembly that couples the pull-type implement to the tractor.

Referring to FIG. 6, shown is a more detailed view of the tongue assembly 120. The driveline of the U-joint driveline assembly 132 is suspended underneath the tongue assembly 120 using a bracket 200 and associated hardware 202. The forward end 204 of the tongue assembly 120 comprises a bracket structure 206 that is secured (e.g., bolted) to opposing sides of the upper right angle gearbox 118. The rearward end 208 is coupled to the pull-type implement 102 in known manner.

It should be emphasized that the above-described embodiments of the present disclosure are merely possible examples of implementations, merely set forth for a clear understanding of the principles of the swivel drawbar hitch 104 and associated systems and apparatuses. Many variations and modifications may be made to the above-described embodiment(s) without departing substantially from the spirit and principles of the disclosure. For instance, the swivel drawbar hitch 104 may be a standalone assembly (e.g., comprising in one embodiment the multi-sided bracket 148 and the first and second cradles 110, 112, or the aforementioned components in addition to other components, such as the gearbox assembly 114, the tongue assembly 120, U-joint driveline 130, and/or other components), or in some embodiments, embodied as part of a system that includes the tractor 100, the pull-type implement 102, or a combination of both or a subset of these component parts. Although all such modifications and variations are intended to be included herein within the scope of this disclosure and protected by the following claims, the following claims are not necessarily limited to the particular embodiments set out in the description.

What is claimed is:

1. A swivel drawbar hitch, comprising:
a bracket comprising plural sides, one of the sides comprising laterally spaced, transverse members extending out from the one of the sides;
a first cradle comprising a curved frame and a first pivot mechanism partially held by the curved frame, the first cradle adapted to be secured to a drawbar at a first location; and
an elongated second cradle comprising laterally spaced fore-and-aft sidewalls extending from a first end to a second end of the elongated second cradle, the first pivot mechanism coupled between the fore-and-aft sidewalls proximal to the first end relative to the second end, the elongated second cradle further comprising a second pivot mechanism coupled between the transverse members of the bracket proximal to the second end relative to the first end, the first location disposed between the first pivot mechanism and the second pivot mechanism, the first cradle pivotable about a horizontal axis of the swivel drawbar hitch, the elongated second cradle pivotable about a longitudinal axis of the swivel drawbar hitch.

2. The swivel drawbar hitch of claim 1, further comprising a gearbox assembly, the gearbox assembly comprising a first right angle gearbox in pivotal relationship with a second right angle gearbox.

3. The swivel drawbar hitch of claim 2, wherein the bracket is connected to plural sides of the second right angle gearbox.

4. The swivel drawbar hitch of claim 3, further comprising a first U-joint driveline coupled between a power take-off shaft and the second right angle gearbox.

5. The swivel drawbar hitch of claim 4, further comprising a tongue assembly comprising a second U-joint driveline coupled to a pull-type implement, the gearbox assembly coupling the first U-joint driveline to the second U-joint driveline, the tongue assembly coupled to the first right angle gearbox and pivotable about an upright axis.

6. The swivel drawbar hitch of claim 1, wherein the first pivot mechanism absorbs and substantially isolates from the rest of the swivel drawbar hitch upward and downward bending loads caused by movement over uneven surfaces by a tractor, a pull-type implement, or a combination of both, the tractor and the pull-type implement coupled to the swivel drawbar hitch during imposition of the bending loads.

7. The swivel drawbar hitch of claim 1, wherein the second pivot mechanism absorbs and substantially isolates from the rest of the swivel drawbar hitch yaw-type movement bending loads caused by movement over uneven surfaces by a tractor, a pull-type implement, or a combination of both, the tractor and the pull-type implement coupled to the swivel drawbar hitch during imposition of the bending loads.

8. The swivel drawbar hitch of claim 1, wherein the first pivot mechanism comprises a first hollow, cylindrical sleeve, a first bushing disposed within the cylindrical sleeve, and a first pair of securing elements disposed through respective openings of the first hollow, cylindrical sleeve, each securing element of the first pair penetrating a slot of one of the fore-and-aft sidewalls.

9. The swivel drawbar hitch of claim 1, wherein the second pivot mechanism comprises a second hollow, cylindrical sleeve, a second bushing disposed within the cylindrical sleeve, and a securing element surrounded by the second bushing, the securing element penetrating a respective slot of the transverse members.

10. The swivel drawbar hitch of claim 1, further comprising a drawbar pin adapted to secure the first cradle to the drawbar at the first location.

11. A pull-type implement, comprising:
a header comprising operating components;
a tongue assembly comprising a first driveline, the tongue assembly coupled to the header; and
a swivel drawbar hitch pivotably coupled to the tongue assembly, the swivel drawbar hitch comprising:
a gearbox assembly, the gearbox assembly comprising a first right angle gearbox in pivotal relationship with a second right angle gearbox;
a bracket comprising plural sides, one of the sides comprising laterally spaced, transverse members extending from the one of the sides, the bracket connected to plural sides of the second right angle gearbox;
a first cradle comprising a curved frame and a first pivot mechanism partially held by the curved frame, the first cradle adapted to be secured to a drawbar at a first location; and
an elongated second cradle comprising laterally spaced fore-and-aft sidewalls extending from a first end to a second end of the elongated second cradle, the first pivot mechanism coupled between the fore-and-aft sidewalls proximal to the first end relative to the second end, the elongated second cradle further comprising a second pivot mechanism coupled between the transverse members of the bracket proximal to the second end relative to the first end, the first location disposed between the first pivot mechanism and the second pivot mechanism, the first cradle pivotable about a horizontal axis of the swivel drawbar hitch, the elongated second cradle pivotable about a longitudinal axis of the swivel drawbar hitch.

12. The pull-type implement of claim 11, further comprising a second driveline coupled between a power take-off shaft and the second right angle gearbox, the gearbox assembly coupling the first driveline to the second driveline.

13. The pull-type implement of claim 11, wherein the tongue assembly is pivotable about an upright axis.

14. The pull-type implement of claim 11, wherein the first pivot mechanism absorbs and substantially isolates from the rest of the swivel drawbar hitch upward and downward bending loads caused by movement over uneven surfaces by a tractor coupled to the first cradle via the drawbar, the pull-type implement, or a combination of both, the tractor and the pull-type implement coupled to the swivel drawbar hitch during imposition of the bending loads.

15. The pull-type implement of claim 11, wherein the second pivot mechanism absorbs and substantially isolates from the rest of the swivel drawbar hitch yaw-type movement bending loads caused by movement over uneven surfaces by a tractor coupled to the first cradle via the drawbar, the pull-type implement, or a combination of both, the tractor and the pull-type implement coupled to the swivel drawbar hitch during imposition of the bending loads.

16. The pull-type implement of claim 11, wherein the operating components are mechanically driven.

17. The pull-type implement of claim 11, wherein the operating components correspond to mower conditioners.

18. A tractor system having a power-take-off residing thereon, the tractor system comprising:
a power take-off shaft coupled to a first driveline;
a drawbar; and
a swivel drawbar hitch coupled to the first driveline and pivotably coupled to the drawbar, the swivel drawbar hitch comprising:
a gearbox assembly, the gearbox assembly comprising a first right angle gearbox in pivotal relationship with a second right angle gearbox, the second right angle gearbox comprising an input shaft coupled to the first driveline;
a bracket comprising plural sides, one of the sides comprising laterally spaced, transverse members extending from the one of the sides, the bracket connected to plural sides of the second right angle gearbox;
a first cradle comprising a curved frame and a first pivot mechanism partially held by the curved frame, the first cradle adapted to be secured to the drawbar at a first location; and
an elongated second cradle comprising laterally spaced fore-and-aft sidewalls extending from a first end to a second end of the elongated second cradle, the first pivot mechanism coupled between the fore-and-aft sidewalls proximal to the first end relative to the second end, the elongated second cradle further comprising a second pivot mechanism coupled between the transverse members of the bracket proximal to the second end relative to the first end, the first location disposed between the first pivot mechanism and the second pivot mechanism, the first cradle pivotable about a horizontal axis of the swivel drawbar hitch, the elongated second cradle pivotable about a longitudinal axis of the swivel drawbar hitch.

19. The tractor system of claim 18, wherein the first pivot mechanism absorbs and substantially isolates from the rest of the swivel drawbar hitch upward and downward bending loads caused by movement over uneven surfaces by a tractor of the tractor system, a pull-type implement coupled to the gearbox assembly via a tongue assembly that is secured by a first bracket to the first right angle gearbox, or a combination of both, the tractor and the pull-type implement coupled to the swivel drawbar hitch during imposition of the bending loads.

20. The tractor system of claim 18, wherein the second pivot mechanism absorbs and substantially isolates from the rest of the swivel drawbar hitch yaw-type movement bending loads caused by movement over uneven surfaces by a tractor of the tractor system, a pull-type implement coupled to the gearbox assembly via a tongue assembly that is secured by a first bracket to the first right angle gearbox, or a combination of both, the tractor and the pull-type implement coupled to the swivel drawbar hitch during imposition of the bending loads.

* * * * *